United States Patent [19]

Fischer et al.

[11] 4,079,757
[45] Mar. 21, 1978

[54] SLEEVE WITH FOLDS THEREIN

[75] Inventors: Rolf Fischer, Hanover; Günter Seifert, Sarstedt, both of Germany

[73] Assignee: Continental Gummi-Werke Aktiengesellschaft, Hanover, Germany

[21] Appl. No.: 656,986

[22] Filed: Feb. 10, 1976

[30] Foreign Application Priority Data

Feb. 10, 1975 Germany ............................. 2505542

[51] Int. Cl.² ............................................. F16L 11/11
[52] U.S. Cl. ............................. 138/121; 138/DIG. 11
[58] Field of Search ............... 138/121, 122, 173, 177, 138/DIG. 11

[56] References Cited

U.S. PATENT DOCUMENTS

| 2,739,089 | 3/1956 | Hageltorn | 138/121 |
| 3,201,111 | 8/1965 | Afton | 138/177 |
| 3,313,319 | 4/1967 | Osborn et al. | 138/121 |
| 3,559,692 | 2/1971 | Mantelet | 138/121 |

FOREIGN PATENT DOCUMENTS

| 23,191 of | 1900 | United Kingdom | 138/173 |
| 1,370,679 | 10/1974 | United Kingdom | 138/121 |

Primary Examiner—Richard E. Aegerter
Assistant Examiner—Richard R. Stearns
Attorney, Agent, or Firm—Walter Becker

[57] ABSTRACT

A sleeve of plastomeric or elastomeric material with inner and outer peripheral wall sections which are interconnected by connecting wall sections decreasing in thickness from said inner peripheral wall sections toward said outer peripheral wall sections. Each of the outer peripheral wall sections is provided with an intermediate constriction dividing the respective outer peripheral wall section into two foldable sections.

6 Claims, 3 Drawing Figures

SLEEVE WITH FOLDS THEREIN

The present invention relates to a foldable sleeve of plastomeric or elastomeric material with hollow truncated coneshaped walls and inner and outer folds forming transition areas.

When compensating for movements between machine parts to be sealed by the sleeve, the walls are deformed inasmuch as during an extension of the sleeve, the cone angle of the walls formed with regard to the central axis is decreased whereas when the sleeve is shortened, the said angle is increased so that in an extreme instance the walls are located closely adjacent to each other. In the inner and the outer folds, during an elongation or reduction in the length of the sleeve, merely a bending open or bending closed of the folds occurs. If the folds are bent inwardly or outwardly by the effect of foreign bodies, they easily skip a predetermined tension condition similar to the pop frog effect, and cannot return to their starting position. The result is an early destruction of the sleeve.

It is, therefore, an object of the present invention to provide a foldable sleeve which will overcome the above mentioned drawbacks and will impart upon the sleeve the capability even under the above mentioned condition to return to the desired starting position.

It is another object of this invention to provide a sleeve as set forth in the preceding paragraph which will have a better stability so as to prevent the sleeve at least in lengthwise reduced condition from buckling laterally.

These and other objects and advantages of the invention will appear more clearly from the following specification in connection with the accompanying drawing, in which.

Figure 1:
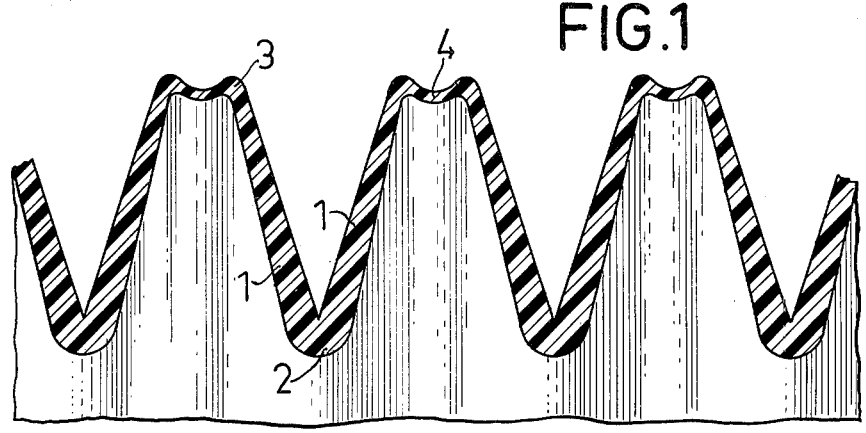
FIG. 1 illustrates a fragmentary section through a sleeve according to the invention in its manufactured condition.

The foldable sleeve according to the present invention is characterized primarily in that at least the outer folds are by means of flat constrictions formed as double folds. As a result thereof, the form stability of the folds is greatly increased. Whereas at the fold two wall portions which are located adjacent to each other merge with each other with the arrangement of double folds, four wall portions each with 3 folds are arranged directly adjacent to each other so that when forces act upon the folds, first the bulging will be made more difficult and subsequently the tendency to return to its starting position will be correspondingly increased. When the folds bulge, decreased upsetting stresses are generated in the material which eventually lead to the pop frog effect. By means of the double fold, in case of a bending, the sleeve is given an additional possibility of compensation.

Furthermore, with foldable sleeves according to the invention, which have walls the thickness of which decreases toward the outer folds, each double fold is provided with a thickened portion in the folds adjacent to the constriction. As a result thereof, an additional stiffening or reinforcement is created which aids the above mentioned elimination of a bulge in the fold.

Expediently, the width of the outer double fold viewed as axial extension is made at least equal to the inner single fold. When reducing the axial length of the sleeve to its shortest axial dimension, the outer folds will be laid against each other at the latest when the inner folds engage each other, or when they have a greater width relative to the inner folds they will engage each other earlier than the latter so that a stable position against buckling will be assured in the sleeve.

The above mentioned constrictions adjacent the thickened folds are provided with less curved bottoms so that they are flatter and have a thinner wall thickness and that consequently there will be created a bending soft zone.

Referring now to the drawing in detail, the sleeve illustrated therein comprises hollow truncated coneshaped walls 1 which in alternately inversed sequence are interconnected by inner folds 2 and outer folds 3. The outer folds 3 are designed by constriction 4 as double folds which means that two ribs are located on both sides of the constriction 4 and therefore appear to form a double fold, whereas actually there is provided a third inwardly directed fold. The material of the folds on both sides of the constriction 4 at the merging area with the wall 1 is thicker than the directly adjacent area of the walls 1 and is also thicker than the thickness of the wall in the constriction 4 which wall is located between the double folds.

Figure 2:
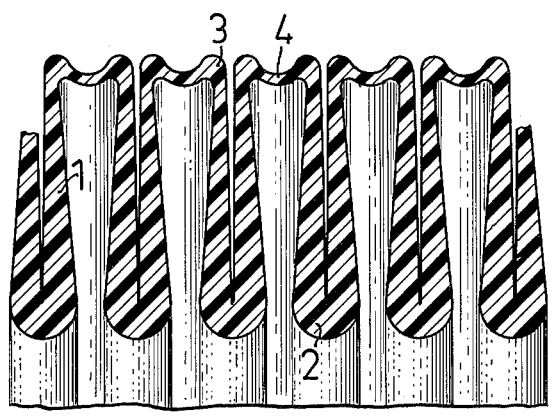
FIG. 2 shows a fragmentary section of a sleeve in axially reduced condition.

FIG. 2 shows that the double folds 3 engage each other at the latest when the inner folds 2 engage each other. This results in a high bulging stability of the sleeve not only in the illustrated end position when shortening the length of the sleeve but also already in essential regions prior to said sleeve reaching its end position during a shortening of the axial length thereof.

Figure 3:
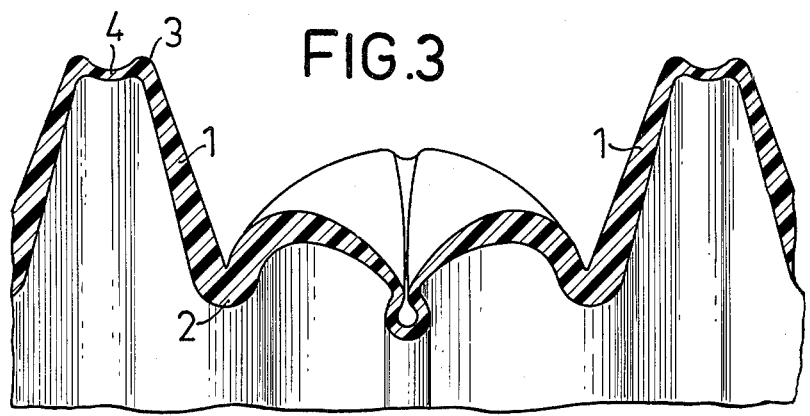
FIG. 3 is a fragmentary section through a sleeve according to the invention with a bulged fold.

FIG. 3 is intended to show that when a bulge occurs in a double fold, the ribs soon engage each other and in the constriction 4 create a condition of tension which aids the springing back of the sleeve to its starting position.

It is, of course, to be understood that the present invention is, by no means, limited to the specific showing in the drawing, but also comprises any modifications within the scope of the appended claims.

What we claim is:

1. A bellows-shaped sleeve of resilient material formed with generally radially extending walls connected at their inner and outer peripheries by alternate inner and outer folds, said sleeve having its maximum thickness at said inner folds and said walls decreasing in thickness outwardly to the outer peripheries of said walls, each of said outer folds having a generally axially extending portion connecting the outer peripheries of adjacent walls, each said extending portion having a constricted portion between said walls which has a lesser diameter than the diameter of the outer peripheries of said walls, said extending portion having an axial length such that on contraction of said sleeve, the adjacent outer folds will be in engagement when the adjacent walls engage along their inner peripheries.

2. A sleeve according to claim 1, in which there are foldable sections of said outer peripheral folds which are located at both sides of the respective constricted portions which increase in thickness from said constricted portion toward the respective connection of said foldable sections with the respective adjacent connecting walls.

3. A sleeve according to claim 2, in which the width of the outer peripheral folds at least equals the width of the inner peripheral folds.

4. A sleeve according to claim 2, in which said constricted portions are in the form of curved concave drawn-in sections.

5. A sleeve according to claim 4, which is of elastomeric material.

6. A sleeve according to claim 4, which is of plastomeric material.

* * * * *

UNITED STATES PATENT OFFICE
CERTIFICATE OF CORRECTION

Patent No. 4,079,757            Dated Mar. 21, 1978

Inventor(s) Rolf Fischer, Günter Seifert

It is certified that error appears in the above-identified patent and that said Letters Patent are hereby corrected as shown below:

[75]    Inventors:    Rolf Fischer, Hannover;
                               Günter Seifert, Sarstedt,
                               both of Germany

[73]    Assignee :    Continental Gummi-Werke
                               Aktiengesellschaft, Hannover,
                               Germany Signed and Sealed this Fifth Day of September 1978

[SEAL]

Attest:

RUTH C. MASON
*Attesting Officer*

DONALD W. BANNER
*Commissioner of Patents and Trademarks*